US010262655B2

(12) United States Patent
Lovitt

(10) Patent No.: US 10,262,655 B2
(45) Date of Patent: Apr. 16, 2019

(54) AUGMENTATION OF KEY PHRASE USER RECOGNITION

(71) Applicant: Microsoft Technology Licensing, LLC, Redmond, WA (US)

(72) Inventor: Andrew William Lovitt, Redmond, WA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 0 days.

(21) Appl. No.: 14/827,154

(22) Filed: Aug. 14, 2015

(65) Prior Publication Data
US 2016/0125879 A1 May 5, 2016

Related U.S. Application Data

(60) Provisional application No. 62/074,562, filed on Nov. 3, 2014.

(51) Int. Cl.
*G10L 17/00* (2013.01)
*G10L 15/22* (2006.01)
(Continued)

(52) U.S. Cl.
CPC .............. *G10L 15/22* (2013.01); *G06F 3/167* (2013.01); *G10L 15/08* (2013.01); *G10L 17/10* (2013.01);
(Continued)

(58) Field of Classification Search
CPC ......... G10L 17/00; G10L 17/02; G10L 17/04; G10L 17/06; G10L 17/12; G10L 17/14; G10L 17/22; G10L 17/24; G10L 17/28; G10L 15/00; G10L 15/20; G10L 15/22; G10L 15/24; G10L 15/26
(Continued)

(56) References Cited

U.S. PATENT DOCUMENTS 6,714,840 B2 * 3/2004 Sakaue .................. B25J 9/1694
318/568.1
7,822,605 B2 10/2010 Zigel et al.
(Continued)

OTHER PUBLICATIONS

ISA European Patent Office, International Search Report and Written Opinion Issued in Application No. PCT/US2015/058538, dated Feb. 12, 2016, WIPO, 13 Pages.
(Continued)

*Primary Examiner* — Qi Han
(74) *Attorney, Agent, or Firm* — Alleman Hall Creasman & Tuttle LLP

(57) ABSTRACT

Examples for augmenting user recognition via speech are provided. One example method comprises, on a computing device, monitoring a use environment via one or more sensors including an acoustic sensor, detecting utterance of a key phrase via data from the acoustic sensor, and based upon the selected data from the acoustic sensor and also on other environmental sensor data collected at different times than the selected data from the acoustic sensor, determining a probability that the key phrase was spoken by an identified user. The method further includes, if the probability meets or exceeds a threshold probability, then performing an action on the computing device.

16 Claims, 4 Drawing Sheets

(51) Int. Cl.
*G06F 3/16* (2006.01)
*G10L 15/08* (2006.01)
*G10L 17/10* (2013.01)
*G10L 17/24* (2013.01)

(52) U.S. Cl.
CPC ........ *G10L 17/24* (2013.01); *G10L 2015/088* (2013.01); *G10L 2015/226* (2013.01); *G10L 2015/227* (2013.01)

(58) Field of Classification Search
USPC .... 704/275, 270, 270.1, 273, 231, 235, 246, 704/251
See application file for complete search history.

(56) References Cited

U.S. PATENT DOCUMENTS

| | | | |
|---|---|---|---|
| 8,099,288 B2 | 1/2012 | Zhang et al. | |
| 8,510,215 B2 | 8/2013 | Gutierrez et al. | |
| 8,645,137 B2 | 2/2014 | Bellegarda et al. | |
| 9,256,457 B1* | 2/2016 | Leske | G06F 9/46 |
| 9,319,221 B1* | 4/2016 | Awad | H04L 9/3231 |
| 2003/0122652 A1 | 7/2003 | Himmelstein | |
| 2006/0041926 A1* | 2/2006 | Istvan | H04N 5/4403 725/133 |
| 2006/0282649 A1* | 12/2006 | Malamud | H04L 63/0861 712/26 |
| 2011/0184735 A1 | 7/2011 | Flaks et al. | |
| 2013/0006634 A1 | 1/2013 | Grokop et al. | |
| 2013/0225128 A1 | 8/2013 | Gomar | |
| 2014/0226855 A1* | 8/2014 | Savvides | G06K 9/00771 382/103 |
| 2014/0249817 A1 | 9/2014 | Hart et al. | |
| 2015/0279360 A1* | 10/2015 | Mengibar | G10L 15/18 704/257 |
| 2016/0021238 A1* | 1/2016 | Abramson | H04W 48/04 455/418 |

OTHER PUBLICATIONS

IPEA European Patent Office, Second Written Opinion Issued in PCT Application No. PCT/US2015/058538, dated Oct. 10, 2016, WIPO, 6 pages.

IPEA European Patent Office, International Preliminary Report on Patentability Issued in PCT Application No. PCT/US2015/058538, dated Jan. 31, 2017, WIPO, 9 Pages.

* cited by examiner

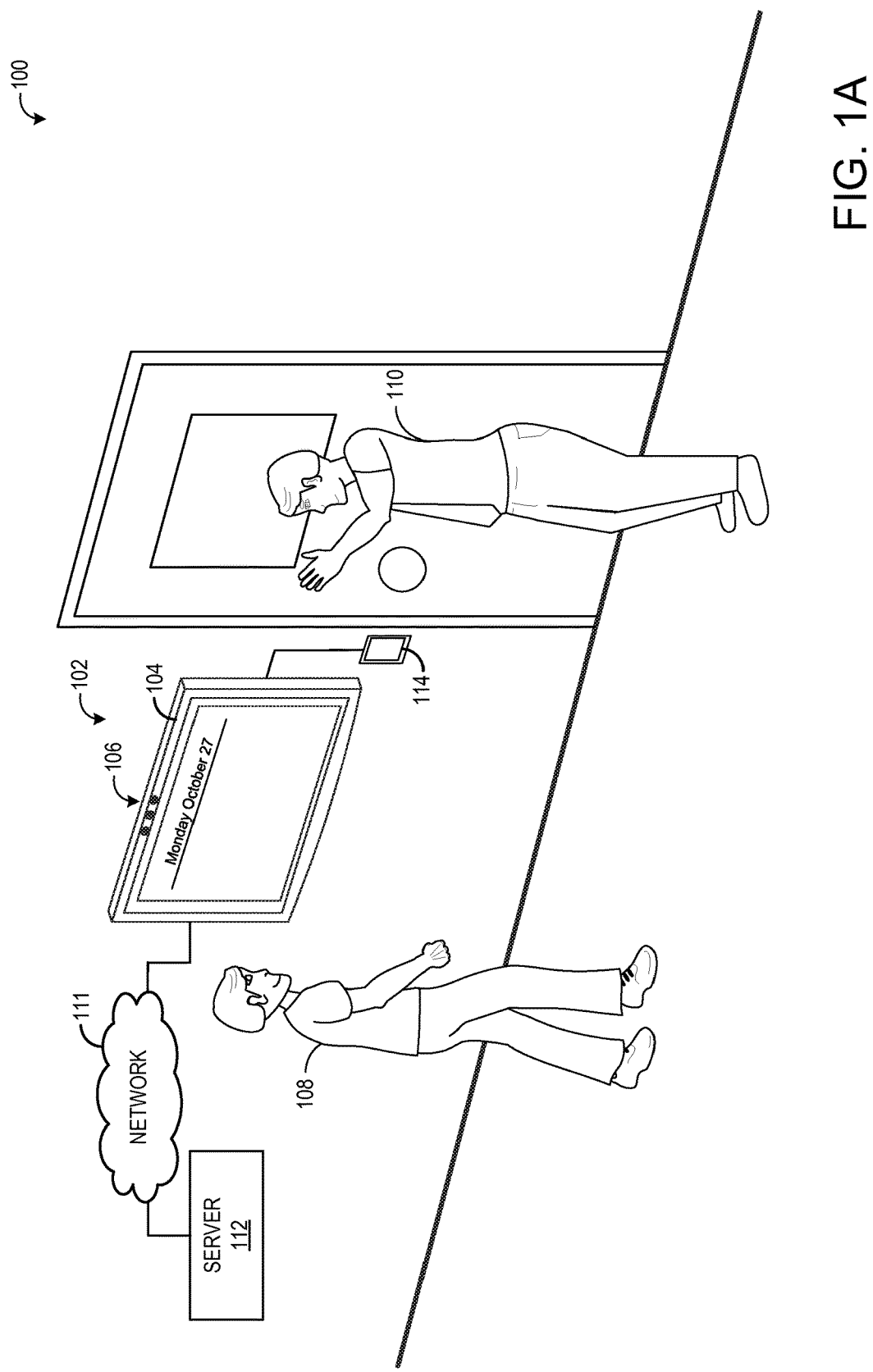

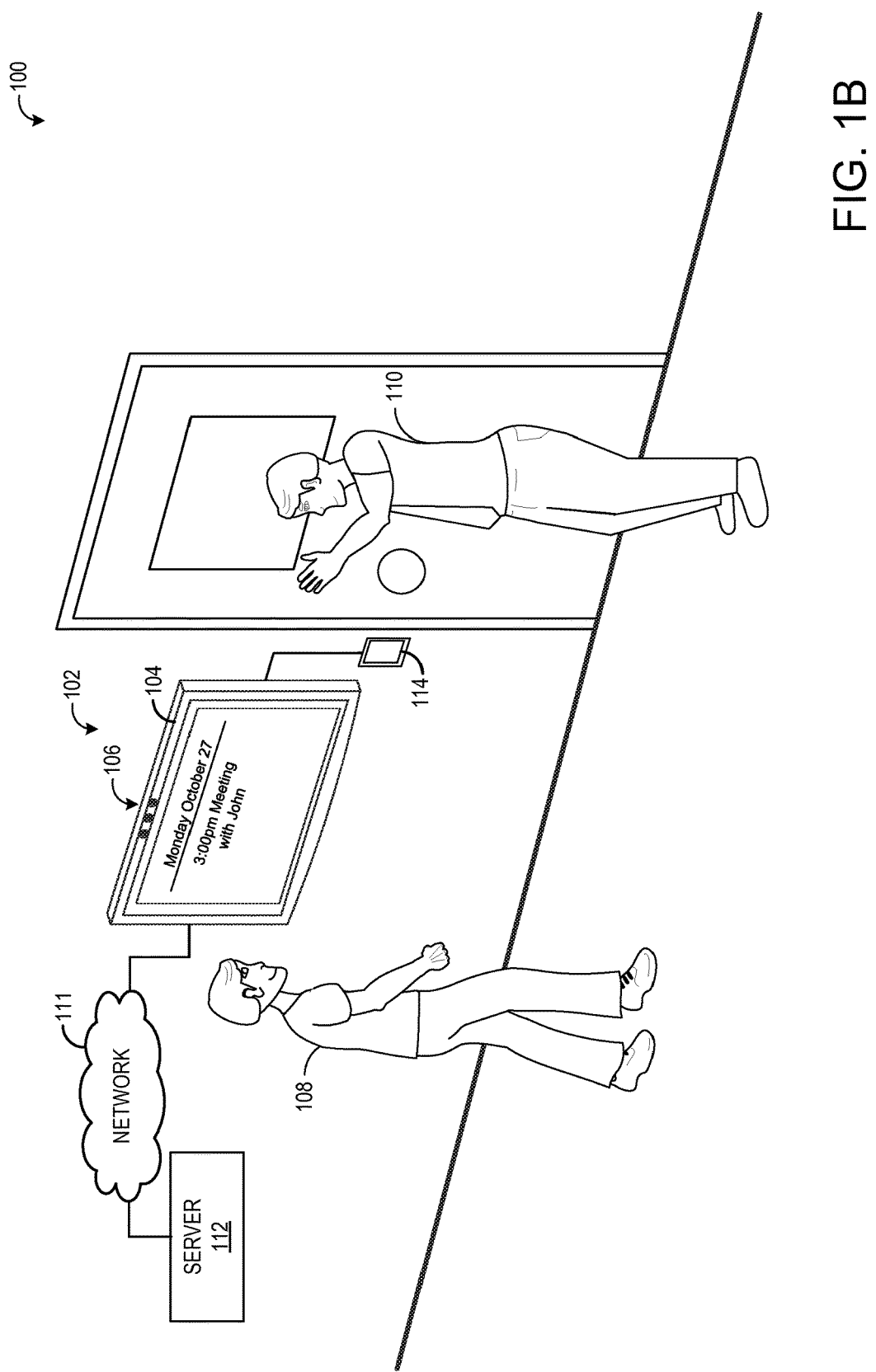

AUGMENTATION OF KEY PHRASE USER RECOGNITION

CROSS REFERENCE TO RELATED APPLICATIONS

This application claims priority to U.S. Application No. 62/074,562, filed Nov. 3, 2014, the entirety of which is incorporated herein by reference.

BACKGROUND

A computing system may utilize various methods of user identification to permit access to personalized and/or confidential information, such as user account information, files on a computing system, email account(s), bank account(s), etc. For example, a user may enter a user name and password to start a use session, and actions performed during the use session may be assumed to originate from that user. Other methods may involve using biometric methods, such as speaker recognition, which involves the identification of a person from voice characteristics of that person.

SUMMARY

Examples for augmenting user recognition via speech are provided. One example method comprises, on a computing device, monitoring a use environment via one or more sensors including an acoustic sensor, detecting utterance of a key phrase via data from the acoustic sensor, and based upon the selected data from the acoustic sensor and also on other environmental sensor data collected at different times than the selected data from the acoustic sensor, determining a probability that the key phrase was spoken by an identified user. The method further includes, if the probability meets or exceeds a threshold probability, then performing an action on the computing device.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIGS. 1A and 1B show an example use environment for user recognition via key phrase analysis.

DETAILED DESCRIPTION

Figure 2:
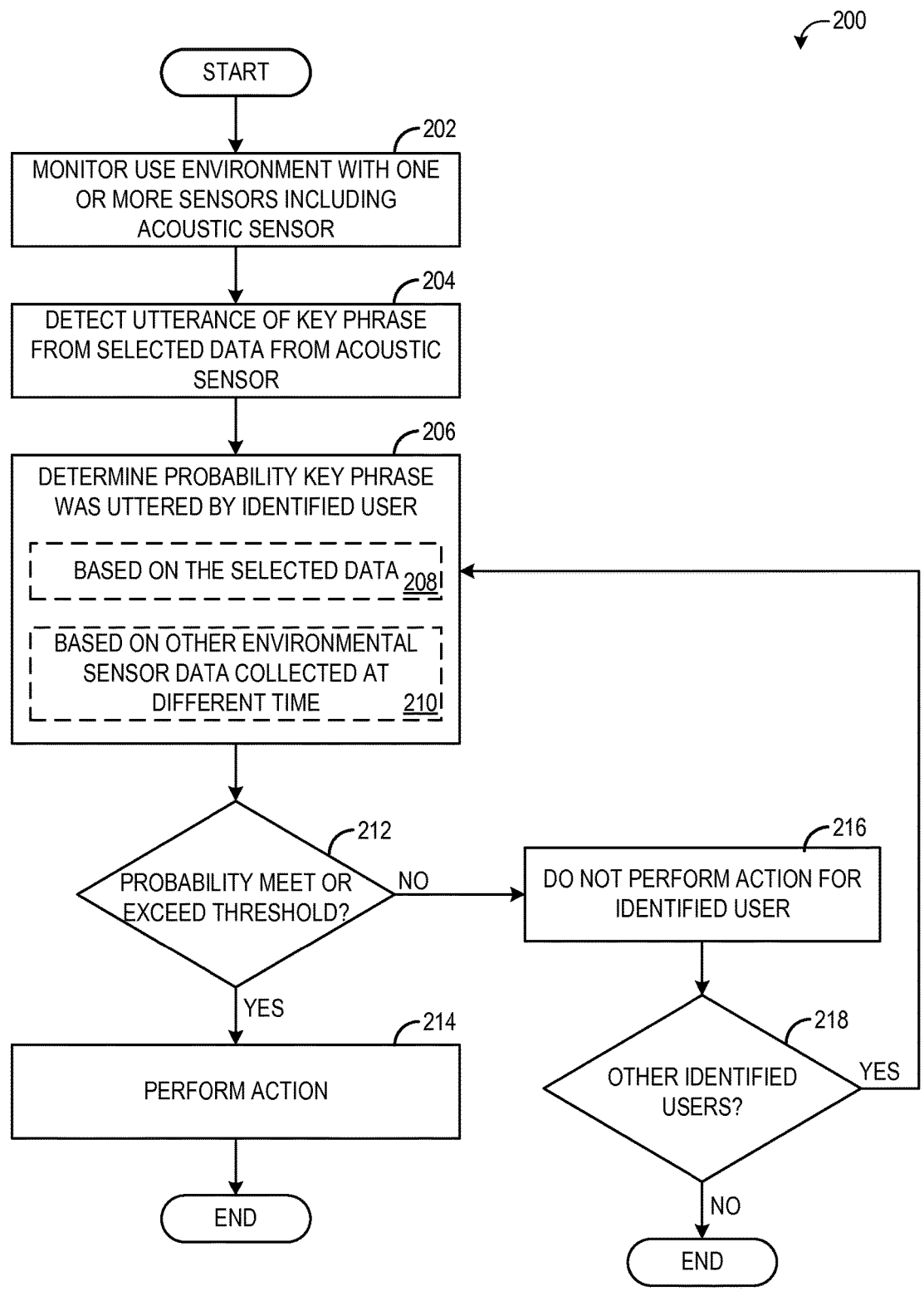
FIG. 2 shows a flow chart illustrating an example method for augmenting user recognition via key phrase detection.

Examples are disclosed herein that relate to user recognition via voice identification utilizing key phrases identified in speech inputs. Speech inputs may take the form of a specific word, group of words, sounds (e.g., laugh, click, or other acoustic sounds), also referred to as a key phrase, followed by a command. Thus, the use of key phrases for speaker identification may allow a speaker to be identified and a computing system function to be invoked via a same utterance, which may provide for an intuitive and efficient user experience.

However, key phrases may be relatively short, such as just a few words, or even a single word. Due to the small duration of voice data spanned by the key phrase, there is a risk of false rejections and/or false identifications. Thus, the disclosed examples relate to augmenting key phrase-based speaker recognition with environmental contextual information collected at one or more different times than the utterance of the key phrase. For example, the computing system performing the voice identification may collect additional acoustic data from before and/or after the utterance of the key phrase. The additional acoustic data may be analyzed to determine if the speaker identified by the voice identification was also speaking (or not speaking) before or after the key phrase was uttered. If the analysis indicates the speaker was speaking before or after the utterance of the key phrase, then it may be determined to be more probable that the identified speaker did speak the key phrase. It will be understood that any environmental information that may be detected via sensing devices and that may be indicative of an identity of a person who utters a key phrase may be utilized. Examples include, but are not limited to, acoustic data, image data (such as infrared image data, visible image data, depth image data, etc.), location data, motion data, and olfactory data.

FIG. 1A shows an example use environment 100 in which a computing system may perform user recognition based on key phrase detection and environmental contextual information. Use environment 100 is illustrated in FIG. 1 as an office environment, such as a hallway outside of conference room, where computing system 102 displays an empty conference room schedule. It will be understood that the illustrated use environment is presented for the purpose of example and is not intended to be limiting, and that the disclosed examples may be used in any other suitable use environment.

Computing system 102 includes a display device 104 and one or more sensors 106. Sensors 106 may include any suitable sensors for sensing data to augment a speaker recognition process. As non-limiting examples, sensors 106 may include one or more acoustic sensors (e.g., microphone or microphone array) and one or more image sensors (e.g. visible light camera, depth camera, infrared camera, etc.). Further, use environment 100 may include additional sensors located remotely from computing system 102. As a non-limiting example, use environment 100 may include a proximity sensor, such as an RFID sensor 114, configured to sense the proximity of an electronically readable tag, such as an RFID access card. Computing system 102 also may communicate wirelessly with one or more external devices having additional sensors. For example, computing system 102 may communicate wirelessly with a mobile device of user 108 and/or user 110 to obtain GPS data, motion data, and other data specific to that mobile device.

Computing system 102 further may communicate with other computing systems over a network 111, such as with a server 112 that comprises user account information (e.g. employee information). Such user account information may include identifying information for each user, such as voice pattern data, image recognition data (e.g. color images, depth images, infrared images, etc.) for each recognized user, as well as other identifying information (e.g. access card information). Additional information regarding computing system 102 is presented below with respect to FIG. 3.

Computing system 102 may be configured to perform various actions in response to user voice input. For example, as shown in FIG. 1A, first user 108 may request to have the computing system schedule a meeting between the first user and a second user, for example, by performing a speech input comprising a key phrase and command. As a specific example, first user 108 may speak the key phrase "Hey Assistant," followed by the command "please book a meeting for today at 3 pm for me and John for one hour." Computing system 102 may detect the key phrase from acoustic data received by sensors 106, and use the key phrase to recognize the identity of the speaker making the command to determine for whom to reserve the room. Further, contextual environmental data also may be used to identify "John" as second user 110.

However, as explained above, in light of the brevity of the key phrase, it may be difficult for the computing system to accurately identify the speaker of the key phrase using the key phrase data alone. This may give rise to a risk of false positive or false negative identifications. Thus, to increase the likelihood that the determined identity of the speaker is correct, computing system 102 may augment the key phrase speaker identification using environmental contextual data collected before and/or after the utterance of the key phrase. Such environmental data may be collected via sensors 106 and/or via sensors of one or more computing systems external to system 102. For example, acoustic data gathered by sensors 106 may be used to determine the identities of people speaking nearby sensors 106 before and/or after the utterance of the key phrase. This may provide information regarding the identity of users in the environment when the key phrase was spoken, and may thus may increase a probability that the key phrase was spoken by one of those people. As another example, image data gathered by sensors 106 may acquire image information usable by the computing system 102 to determine the identities of any users that were present in the use environment before and/or after the utterance of the key phrase. As a further example, user location data (e.g. as determined via GPS sensor data from a user's mobile device, via an RFID access card, etc.) may be used to augment a speaker identification process.

Environmental contextual data may be used to augment the key phrase speaker identification in any suitable manner. For example, the computing system 102 may use the environmental contextual data as an input to a probability determination. As a more specific example, acoustic data gathered by sensors 106 may be used by computing system 102 to detect that first user 108 was speaking prior to and/or after the utterance of the key phrase (e.g., first user 108 may have requested to view a weather report on display device 104 prior to uttering the key phrase), which may increase a probability that the first user 108 uttered the key phrase. In another example, an image sensor of the computing system 102 may detect that both first user 108 and second user 110 were present in the use environment 100 when the key phrase was detected, but also that second user 110 was merely passing by computing system 102 when the key phrase was uttered (e.g., the image information may indicate that second user 110 left the use environment following utterance of the key phrase). Thus, the probability that the second user 110 uttered the key phrase may be lower than if this data were not considered.

FIG. 2 shows a flow diagram depicting an example of a method 200 for augmenting a key phrase detection. Method 200 may be carried out by a computing device, such as computing system 102 of FIG. 1. At 202, method 200 includes monitoring a use environment with one or more sensors including an acoustic sensor. As described above, any suitable sensors may be used, such as sensors located on the computing device and/or sensors located remotely from the computing device. In addition to the acoustic sensor, examples of other sensors include, but are not limited to, image sensors, location sensors, and motion sensors. In one example, the one or more sensors may continually monitor the use environment regardless of the presence of users, of interaction between users and the computing device, etc. In other examples, one or more sensors may operate in a lower power mode until activity is detected, and then acquire environmental contextual data in a higher power mode upon detecting some triggering activity (e.g. motion and/or a presence of a person in image data, a presence of a human voice in acoustic data, a detection of a proximate person via a proximity sensor, etc.). The environmental contextual information collected by the one or more sensors may be stored locally in a memory device of the computing device and/or sent to a remote device.

At 204, method 200 comprises detecting an utterance of a key phrase from selected acoustic sensor data. As explained above, the key phrase may be usable by the computing device to identify a user from among a set of possible users. Further, in some examples, utterance of the key phrase may be followed by a command configured to invoke an action to be performed by the computing device, where the action is related to the identified user. It will be understood that the key phrase may be detected using any suitable speech analysis pipeline.

Continuing, at 206, method 200 comprises determining a probability that the key phrase was uttered by an identified user based upon data from the acoustic sensor, as indicated at 208. In some examples, the computing device may be able to identify the user solely based on the key phrase. However, if the computing device cannot identify the user solely based on the key phrase, or if a higher probability identification is desired, additional analysis of collected data may be carried out. Thus, the probability also may be determined based on other environmental sensor data collected at a different time, as indicated at 210.

As described above with respect to FIG. 1, the other environmental sensor data may include acoustic data collected before and/or after the key phrase was uttered. For example, the computing device may continually collect acoustic data and store the acoustic data in a buffer. When the key phrase is detected, the computing device may analyze the stored acoustic data for information relevant to a probability that the key phrase was uttered by an identified user. Such information may include, but is not limited to, whether the identified user was speaking within a window of time (e.g. within a few minutes) before and/or after detection of the utterance of the key phrase.

As a more specific example, the computing device may analyze the additional acoustic data to determine if a user that the computing device has identified as possibly uttering the key phrase was also speaking before or after the key phrase was uttered. If the analysis indicates the identified user was speaking before or after the utterance of the key phrase, then the computing device may increase the probability that the key phrase was spoken by the identified user, while if the analysis indicates the identified user was not speaking before or after the utterance of the key phrase, the computing device may decrease the probability that the key phrase was spoken by the identified user.

The other environmental sensor data further may include image data collected before and/or after the detection of the utterance of the key phrase. For example, image information may indicate whether the identified user was in the same room as the computing device before and/or after the key phrase was spoken. Also, the other environmental sensor data may include location data collected from a sensor located remotely from the computing device. For example, the identified user may have a portable computing device with a location sensor (e.g., GPS) in communication with the computing device, and the location data may indicate where the identified user was located prior to or after the key phrase was detected. Such location information also may include RFID data or other proximity data from a proximity sensor, calendar information of the identified user (e.g., was the identified user scheduled to be in the same room as the computing device), and/or any other suitable data relevant to location.

As a more specific example, the computing device may determine whether a user was scheduled to be in a given use environment (such as a conference room) during a time that the utterance of key phrase was detected based on the user's calendar information. If the user was scheduled to be in the use environment, then the computing device may increase the probability that the key phrase was spoken by that user. On the other hand, if that user's calendar information indicated the user was not scheduled to be in the use environment, the computing device may lower the probability that the key phrase was spoken by that user.

In some implementations, environmental data may be analyzed to detect user behavioral patterns that may be used as additional inputs to a probability determination. For example, where acoustic data is analyzed to determine whether a user was speaking prior to utterance of the key phrase, analysis of voice data may be used to determine whether the identified user tends to speak a lot or speak a little. This information may then be used as an input to the probability determination, such that information regarding whether a user spoke before and/or after a keyword utterance may be weighted based upon how often the user tends to speak. Further behavioral patterns and/or environmental data that may be used to weight the probability of whether the user uttered the key phrase may include the environment in which the user is located. For example, a user may tend to speak more in his or her office than a conference room, speak more in a conference room than a park, etc. In one more specific example, a user behavioral pattern may be determined by the computing device based upon prior user behaviors detected via environmental sensing (e.g., from data collected by the sensors described above). The user behavioral pattern may include a measure of how frequently the user tends to speak, and the computing device may adjust the probability based on the measure of how frequently the identified user speaks. For example the probability may be decreased if the user has a relatively low average frequency he or she tends to speak.

Continuing with FIG. 2, method 200 comprises, at 212, comparing the determined probability that the identified user uttered the key phrase to a threshold probability. The threshold probability may be any suitable threshold that indicates a desired level of confidence that the identified user actually uttered the key phrase. In some examples, the threshold probability may be a numerical value (e.g., 0.95 or 95%) while in other examples the threshold probability may be a rank of all possible identified users (e.g., the probability may meet or exceed the threshold if the probability indicates the identified user has the highest probability of all possible users). It will be understood that different thresholds may apply to different types of access restrictions. For example, a higher threshold may apply to granting access to banking information based upon speaker identification than to launching a video game with a particular user profile based upon speaker identification.

If the probability meets or exceeds the threshold probability, then method 200 comprises, at 214, performing an action on the computing device. The action may include authenticating the identified user in order to allow the identified user access to the computing device and/or personalized information via the computing device. Further, in some examples, the utterance of the key phrase may be followed by a command for the computing device to perform a particular action, such as schedule a meeting. In such cases, the action performed in response to the probability meeting or exceeding the threshold may include performing the action commanded by the identified user.

On the other hand, if the probability does not meet or exceed the threshold probability, then method 200 comprises not performing the action, as indicated at 216. However, in some examples more than one user may be identified as potentially uttering the key phrase. Thus, at 218 method 200 includes determining if other users have been identified as potentially uttering the key phrase. If no other users have been identified, method 200 may end. If other possible users have been identified, the method may loop back to 206 to determine a probability for one or more additional identified users.

The detection of the key phrase utterance and identified user probability described above are described as being performed on the computing device at which the key phrase is being directed. However, in some examples the environmental sensor data (including the acoustic sensor data) may be sent to a remote device, and the key phrase detection and user identification performed by the remote device. The remote device may then send an indication of the identified user to the computing device.

While the key phrase speaker recognition described above utilizes acoustic data, it is to be understood that the key phrase detection may comprise alternate or additional modalities, such as visual modalities. To perform the audio-based identification, template matching of audio streams may be performed or analysis of audio streams and comparison against a model for a user or comparison against "not the user" may be performed. The analysis and probability determination may be performed locally on the computing device or may be performed remotely on a server, for example. In some examples, the input audio stream may be adjusted (e.g., noise suppression or echo cancellation) prior to performing the key phrase detection.

In one example, the computing device may continuously store a buffer of memory for collected audio input, where the memory is local, in the cloud, or on a second device. The device may detect a user uttering the key phrase. The device may then make a determination of the user who said the key phrase and then look through the history and determine if the user was speaking previously (in some time window). If so, then the probability that the user said the key phrase is increased. If not, then the probability is lowered. This may also be performed with other users in the history, e.g., if there are three users in the history (of the speaker identification system) then all of the probability of detection of the three users would increase since it is more likely any one of the users continued talking. Placement in the history buffer (or closeness to the key phrase in time) may also be used to adjust the probability.

In the above example, the probability of a user talking may be augmented by visual cues of the user's mouth moving in the history. In one example, a joint probability of the user talking both in the history and for the key phrase are augmented by each other. For example, the computing device may take a highest determined probability that a user was talking through the history and the key phrase, then use this probability to augment the user's probabilities through the entire audio stream on the next pass. This could continue until a clear winner is chosen or a certain number of iterations have passed.

In another example, the computing device may be located in a room where a meeting is occurring. The computing device detects a key phrase and then analyzes the audio history to determine if an identified user was in the room talking. If no, then the computing device may lower the user's probability of having uttered the key phrase. However, the meta information about the user may indicate that the user rarely talks and so the user's probability may not be adjusted, or may be adjusted by a smaller amount. The ability to learn this information may be done in real time (using the computing device) or offline and stored as additional metadata on the meeting, user, or scenarios. In scenarios where the possible users are external partners joining an internal meeting, machine learning may indicate that the external users are more likely to either talk a lot or talk a little. This information is then fed into the speaker identification determination to adjust whether or not the external users may have been talking. Likewise, the meta information may indicate the user should be in the room (based on his calendar), and the probability may be adjusted correspondingly. In an example, a camera in the room may identify or confirm the absence of the user in the room, thus lowering the user's probability or removing the user from consideration altogether.

In a still further example, the computing device may detect the key phrase and the sensor history may be used to update the model for the user when it is confirmed that the user is talking. For example, the user may be talking with a remotely located user (via the computing device, for example) and the user may say the key phrase. The history buffer then has information for when the user was talking (through audio and visual cues). This is then pulled out of the history and used to update the user's speaker identification model. This may be helpful in situations where the user has a cold or for some reason their voice is different. This example may also be used to dynamically identify a new user, or may be used when the user has changed microphones, as this may be implemented to create a new model or augment the current one which could be used on new devices.

In another example, the computing device may be located in a conference room, recording a conversation. The computing device may only include an audio sensor (and hence may not include image or other sensors). The entire conversation may be recorded and processed offline. As the device does not know who is in the room, it may use a large speaker model set to analyze the recording. When looking for key phrases, the device may take into account how often a user's model is evaluated as the correct person talking. In an example, the user's model may be the highest probability. However an analysis of the previous and next five minutes may reveal this user does not talk again. The system may then lower the probability of that user for that key phrase. The device may then analyze the previous and future five minutes and determine that the second highest probability user does talk within that time window. The device may then determine with high likelihood that the second highest probability user is likely to be in the room, as opposed to the highest probability user.

The computing device may use machine learning to determine, in this environment, that the likelihood of a user saying the key phrase but not saying anything else prior or post uttering the key phrase has an extremely low probability, so the device may evaluate just those users who are likely to be talking before and after the key phrase when evaluating who was talking during the key phrase.

In some embodiments, the methods and processes described herein may be tied to a computing system of one or more computing devices. In particular, such methods and processes may be implemented as a computer-application program or service, an application-programming interface (API), a library, and/or other computer-program product.

Figure 3:
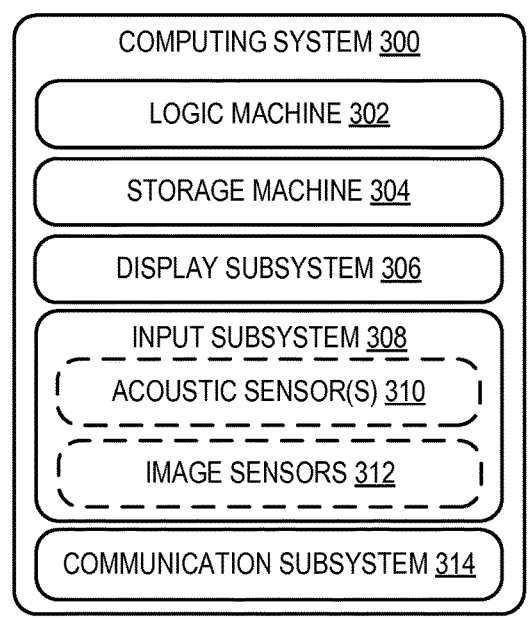
FIG. 3 shows a block diagram of an example computing system.

FIG. 3 schematically shows a non-limiting embodiment of a computing system 300 that can enact one or more of the methods and processes described above. Computing system 300 is shown in simplified form. Computing system 300 may take the form of one or more personal computers, server computers, tablet computers, home-entertainment computers, network computing devices, gaming devices, mobile computing devices, mobile communication devices (e.g., smart phone), and/or other computing devices. Computing system 102 may a non-limiting example of computing system 300.

Computing system 300 includes a logic machine 302 and a storage machine 304. Computing system 300 may optionally include a display subsystem 306, input subsystem 308, communication subsystem 314, and/or other components not shown in FIG. 3.

Logic machine 302 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine may include one or more processors configured to execute software instructions. Additionally or alternatively, the logic machine may include one or more hardware or firmware logic machines configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

Storage machine 304 includes one or more physical devices configured to hold instructions executable by the logic machine to implement the methods and processes described herein. When such methods and processes are implemented, the state of storage machine 304 may be transformed—e.g., to hold different data.

Storage machine 304 may include removable and/or built-in devices. Storage machine 304 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage machine 304 may include volatile, nonvolatile, dynamic, static, read/write, read-only, random-access, sequential-access, location-addressable, file-addressable, and/or content-addressable devices.

It will be appreciated that storage machine 304 includes one or more physical devices. However, aspects of the instructions described herein alternatively may be propagated by a communication medium (e.g., an electromagnetic signal, an optical signal, etc.) that is not held by a physical device for a finite duration.

Aspects of logic machine 302 and storage machine 304 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

Display subsystem 306 may be used to present a visual representation of data held by storage machine 302. This visual representation may take the form of a graphical user interface (GUI). As the herein described methods and processes change the data held by the storage machine, and thus transform the state of the storage machine, the state of display subsystem 306 may likewise be transformed to visually represent changes in the underlying data. Display subsystem 306 may include one or more display devices utilizing virtually any type of technology. Such display devices may be combined with logic machine 302 and/or storage machine 304 in a shared enclosure, or such display devices may be peripheral display devices.

Input subsystem 308 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone 310 for speech and/or voice recognition; an image sensor 312, such as an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

Communication subsystem 314 may be configured to communicatively couple computing system 300 with one or more other computing devices. Communication subsystem 314 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 300 to send and/or receive messages to and/or from other devices via a network such as the Internet.

Another example comprises monitoring a use environment via one or more sensors including an acoustic sensor; detecting utterance of a key phrase via selected data from the acoustic sensor; based upon the selected data from the acoustic sensor and also on other environmental sensor data collected at different times than the selected data from the acoustic sensor, determining a probability that the key phrase was spoken by an identified user; and if the probability meets or exceeds a threshold probability, then performing an action on the computing device. Such an example additionally or alternatively may include wherein the other environmental sensor data comprises acoustic sensor data. In such an example, the other environmental sensor data may additionally or alternatively include image data. Such an example may additionally or alternatively include identifying one or more persons in the use environment based on the image data, and wherein determining the probability comprises determining the probability based at least in part upon a determined identity of the one or more persons in the use environment. In such an example, the other environmental sensor data may additionally or alternatively include location data. In such an example the location data may additionally or alternatively include proximity data from a proximity sensor. In such an example the location data may additionally or alternatively include calendar information for the identified user. Such an example may additionally or alternatively include detecting a user behavioral pattern, and wherein determining the probability comprises determining the probability based at least in part upon the user behavioral pattern. In such an example the user behavioral pattern information may additionally or alternatively include information regarding how often the identified user speaks. Any or all of the above-described examples may be combined in any suitable manner in various implementations.

Another example of a computing system comprises one or more sensors including at least an acoustic sensor; a logic machine; and a storage machine holding instructions executable by the logic machine to monitor a use environment via the one or more sensors including the acoustic sensor; detect utterance of a key phrase via selected data from the acoustic sensor; based upon the selected data from the acoustic sensor and also on other environmental sensor data collected at different times than the selected data from the acoustic sensor, determine a probability that the key phrase was spoken by an identified user; and if the probability meets or exceeds a threshold probability, then perform an action on the computing system. In such an example, the other environmental sensor data may additionally or alternatively include image data, and wherein the instructions are further executable to identify one or more persons in the use environment based on the image data, and to determine the probability based at least in part upon a determined identity of the one or more persons in the use environment. In such an example, the other environmental sensor data may additionally or alternatively include location data, the location data comprising one or more of proximity data from a proximity sensor and calendar information for the identified user. In such an example the instructions may additionally or alternatively be executable to determine whether the identified user is scheduled to be in the use environment during a time that the utterance of key phrase was detected based on the calendar information, and if the identified user is scheduled to be in the use environment, increase the probability that the key phrase was spoken by the identified user. In such an example the instructions may additionally or alternatively be executable to detect a user behavioral pattern based upon prior user behaviors detected via environmental sensing, the user behavioral pattern including information regarding how frequently the identified user speaks, and to determine the probability based on the average frequency the identified user speaks. In such an example the other environmental sensor data collected at different times than the selected data from the acoustic sensor may comprise additional acoustic data collected before and/or after the utterance of the key phrase. In such an example the instructions additionally or alternatively may be executable, to determine the probability that the key phrase was spoken by the identified user, to analyze the additional acoustic data to determine if the identified user was also speaking before or after the key phrase was uttered, and increase the probability that the key phrase was spoken by the identified user if the identified user was also speaking before or after the key phrase was uttered. In such an example the instructions additionally or alternatively may be executable to decrease the probability that the key phrase was spoken by the identified user if the analysis indicates the identified user was not speaking before or after the utterance of the key phrase. Any or all of the above-described examples may be combined in any suitable manner in various implementations.

Another example provides a computing system comprising one or more sensors including an acoustic sensor; a processor configured to execute computer-readable instructions; and a storage device comprising instructions stored thereon that are executable by the processor to monitor a use environment via the one or more sensors including the acoustic sensor; detect utterance of a key phrase followed by a command via selected data from the acoustic sensor, the key phrase configured to identify a user, the command configured to invoke a computing system action related to the user; if an identity of a user who uttered the key phrase is determined based on the selected data from the acoustic sensor, then perform the action on the computing system for the identified user; if an identity of a user who uttered the key phrase is not determined based on the selected data from the acoustic sensor, then determine a probability that the key phrase was uttered by one or more possible users based on other environmental sensor data collected at different times than the selected data from the acoustic sensor; and if the probability meets or exceeds a threshold probability for a selected user of the one or more other possible users, then perform the action on the computing system for the selected user. In such an example, the instructions may additionally or alternatively be executable to detect a user behavioral pattern based upon prior user behaviors detected via environmental sensing, and wherein determining the probability comprises determining the probability based at least in part upon the user behavioral pattern. In such an example the instructions executable to detect the user behavioral pattern may comprise instructions executable to detect information regarding how often the identified user speaks. Any or all of the above-described examples may be combined in any suitable manner in various implementations.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and nonobvious combinations and sub-combinations of the various processes, systems and configurations, and other features, functions, acts, and/or properties disclosed herein, as well as any and all equivalents thereof.

The invention claimed is:

1. On a computing device, a method comprising:
monitoring a use environment via one or more sensors including an acoustic sensor;
detecting via speech recognition an utterance of a key phrase followed by a command via selected data from the acoustic sensor;
based upon the selected data from the acoustic sensor and also on other environmental sensor data collected at different times than the selected data from the acoustic sensor, the other environmental sensor data comprising additional acoustic data, performing voice recognition to determine a probability that the key phrase was spoken by an identified user; and
if the probability meets or exceeds a threshold probability, then attributing the command to the identified user and performing an action specified by the command on the computing device,
wherein performing voice recognition comprises determining whether the identified user was also speaking before or after the key phrase was uttered based on analyzing the additional acoustic data, and
wherein determining the probability comprises determining a higher probability where the additional acoustic data indicates that the identified user was also speaking before or after the key phrase was uttered than where the additional acoustic data indicates that the identified user was not also speaking before or after the key phrase was uttered.

2. The method of claim 1, wherein the other environmental sensor data further comprises image data.

3. The method of claim 2, further comprising identifying one or more persons in the use environment based on the image data, and wherein determining the probability comprises determining the probability based at least in part upon a determined identity of the one or more persons in the use environment.

4. The method of claim 1, wherein the other environmental sensor data further comprises location data.

5. The method of claim 4, wherein the location data comprises proximity data from a proximity sensor.

6. The method of claim 4, wherein the location data comprises calendar information for the identified user.

7. The method of claim 1, further comprising detecting a user behavioral pattern, and wherein determining the probability comprises determining the probability based at least in part upon the user behavioral pattern.

8. The method of claim 7, wherein the user behavioral pattern comprises information regarding how often the identified user speaks.

9. A computing system, comprising:
one or more sensors including at least an acoustic sensor;
a logic machine; and
a storage machine holding instructions executable by the logic machine to
monitor a use environment via the one or more sensors including the acoustic sensor;
detect via speech recognition an utterance of a key phrase followed by a command via selected data from the acoustic sensor;
based upon the selected data from the acoustic sensor and also on other environmental sensor data collected at different times than the selected data from the acoustic sensor, the other environmental sensor data comprising additional acoustic data, perform voice recognition to determine a probability that the key phrase was spoken by an identified user;
analyze the additional acoustic data;
determine that the identified user was also speaking before or after the key phrase was uttered based on analyzing the additional acoustic data;

adjust the probability in response to determining that the identified user was also speaking before or after the key phrase was uttered based on the other environmental sensor data; and if the probability meets or exceeds a threshold probability, then attribute the command to the identified user and perform an action specified by the command on the computing system.

10. The computing system of claim 9, wherein the other environmental sensor data further comprises image data, and wherein the instructions are further executable to identify one or more persons in the use environment based on the image data, and to determine the probability based at least in part upon a determined identity of the one or more persons in the use environment.

11. The computing system of claim 9, wherein the other environmental sensor data further comprises location data, the location data comprising one or more of proximity data from a proximity sensor and calendar information for the identified user.

12. The computing system of claim 11, wherein the instructions are further executable to determine whether the identified user is scheduled to be in the use environment during a time that the utterance of key phrase was detected based on the calendar information, and if the identified user is scheduled to be in the use environment, increase the probability that the key phrase was spoken by the identified user.

13. The computing system of claim 9, wherein the instructions are further executable to detect a user behavioral pattern based upon prior user behaviors detected via environmental sensing, the user behavioral pattern including information regarding how frequently the identified user speaks, and to determine the probability based on the average frequency the identified user speaks.

14. The computing system of claim 9, wherein the additional acoustic data is collected before and/or after the utterance of the key phrase.

15. A computing system, comprising:
one or more sensors including at least an acoustic sensor;
a logic machine; and
a storage machine holding instructions executable by the logic machine to
monitor a use environment via the one or more sensors including the acoustic sensor;
detect utterance of a key phrase followed by a command via selected data from the acoustic sensor;
based upon the selected data from the acoustic sensor and also on other environmental sensor data collected at different times than the selected data from the acoustic sensor, determine a probability that the key phrase was spoken by an identified user; and
if the probability meets or exceeds a threshold probability, then attribute the command to the identified user and perform an action specified by the command on the computing system,
wherein the other environmental sensor data collected at different times than the selected data from the acoustic sensor comprises additional acoustic data collected before and/or after the utterance of the key phrase, and wherein to determine the probability that the key phrase was spoken by the identified user, the instructions are further executable to analyze the additional acoustic data to determine if the identified user was also speaking before or after the key phrase was uttered, and
increase the probability that the key phrase was spoken by the identified user if the identified user was also speaking before or after the key phrase was uttered.

16. The computing system of claim 15, wherein the instructions are further executable to decrease the probability that the key phrase was spoken by the identified user if the analysis indicates the identified user was not speaking before or after the utterance of the key phrase.

* * * * *